(12) United States Patent
Rivolta (10) Patent No.: US 12,505,729 B2
(45) Date of Patent: Dec. 23, 2025

(54) SAFETY WARNING FOR PORTABLE ELECTRONIC DEVICES

(71) Applicant: STMicroelectronics International N.V., Geneva (CH)

(72) Inventor: Stefano Paolo Rivolta, Desio (IT)

(73) Assignee: STMicroelectronics International N.V., Geneva (CH)

( * ) Notice: Subject to any disclaimer, the term of this patent is extended or adjusted under 35 U.S.C. 154(b) by 27 days.

(21) Appl. No.: 18/475,961

(22) Filed: Sep. 27, 2023

(65) Prior Publication Data

US 2025/0104548 A1  Mar. 27, 2025

(51) Int. Cl.
*G08B 21/00* (2006.01)
*G06N 3/0464* (2023.01)
*G06N 20/20* (2019.01)
*G08B 21/18* (2006.01)
*H04W 4/02* (2018.01)

(52) U.S. Cl.
CPC ........... *G08B 21/18* (2013.01); *G06N 3/0464* (2023.01); *G06N 20/20* (2019.01); *H04W 4/025* (2013.01)

(58) Field of Classification Search
CPC ...... G08B 21/18; G06N 3/0464; G06N 20/20; H04W 4/025
USPC .......................................................... 340/635
See application file for complete search history.

(56) References Cited

U.S. PATENT DOCUMENTS

| | | | |
|---|---|---|---|
| 8,731,530 B1 | 5/2014 | Breed et al. | |
| 8,892,391 B2 | 11/2014 | Tu et al. | |
| 9,723,383 B2 | 8/2017 | Jang et al. | |
| 9,778,280 B2 | 10/2017 | Yuen et al. | |
| 9,854,086 B1* | 12/2017 | McSchooler | H04W 4/48 |
| 10,101,793 B2 | 10/2018 | Tu et al. | |
| 11,429,883 B2* | 8/2022 | Dotan-Cohen | G06Q 10/04 |
| 11,599,178 B2 | 3/2023 | Rivolta et al. | |
| 2011/0264715 A1* | 10/2011 | Singer | G06F 16/29 |
| | | | 348/222.1 |
| 2014/0184502 A1 | 7/2014 | Liu | |
| 2014/0317429 A1 | 10/2014 | Wang | |
| 2017/0030716 A1* | 2/2017 | Ali | G06V 40/10 |
| 2017/0329949 A1 | 11/2017 | Civelli | |
| 2018/0259352 A1* | 9/2018 | Han | G08G 1/096811 |

(Continued)

FOREIGN PATENT DOCUMENTS

EP          3416358 A1      12/2018

*Primary Examiner* — Tai T Nguyen
(74) *Attorney, Agent, or Firm* — Seed IP Law Group LLP (57) ABSTRACT

A device includes one or more motion sensors and processing circuitry coupled to the one or more motion sensors. The one or more sensors, in operation, generate motion sensor signals. The processing circuitry, in operation, classifies a user-activity type based on the motion sensor signals, the user-activity type being selected from a plurality of user-activity types including one or more moving activity types, detects a tilt angle of the device based on the motion sensor signals, and classifies a use-condition of the device as used or not used based on the detected tilt angle. The processing circuitry generates a use-warning signal based on whether the classification of the user-activity type is a moving activity type and on whether the classification of the use-condition is used. The device may include an integrated circuit including the motion sensors and the processing circuitry, and the integrated circuit may be embedded in a display.

19 Claims, 5 Drawing Sheets

(56) References Cited

U.S. PATENT DOCUMENTS

| | | |
|---|---|---|
| 2020/0090488 A1 | 3/2020 | Qi et al. |
| 2023/0023149 A1 | 1/2023 | Rivolta et al. |
| 2023/0123815 A1 | 4/2023 | Suárez et al. |

* cited by examiner

|  | Example 1 | Example 2 | Example 3 | Example 4 |
|---|---|---|---|---|
| Moving / Not Moving Classification | Moving | Not Moving | Moving | Not Moving |
| Used / Not-Used Classification | Used | Used | Not-Used | Not-Used |
| Use-Warning Generated? | Yes | No | No | No |

SAFETY WARNING FOR PORTABLE ELECTRONIC DEVICES

BACKGROUND

Technical Field

The present disclosure generally relates to activity recognition, for example in portable electronic devices.

Description of the Related Art

Electronic devices, such as smartphones, laptops, smart bands, smart watches, smart pens, etc., often use position, orientation, gesture, motion, location and other information to facilitate the control and operation of the devices. The electronic devices may typically include multiple sensors, such as GPS systems, accelerometers, gyroscopes, pressure sensors, etc., to sense such position, gesture, motion, location and other information.

BRIEF SUMMARY

In an embodiment, a device includes one or more motion sensors and processing circuitry coupled to the one or more motion sensors. The one or more motion sensors, in operation, generate motion sensor signals. The processing circuitry, in operation, classifies a user-activity type based on the motion sensor signals, the user-activity type being selected from a plurality of user-activity types including one or more moving activity types, detects a tilt angle of the device based on the motion sensor signals, and classifies a use-condition of the device as used or not used based on the detected tilt angle. The processing circuitry generates a use-warning signal based on whether the classification of the user-activity type is a moving activity type and on whether the classification of the use-condition is used. The device may include an integrated circuit including the motion sensors and the processing circuitry, and the integrated circuit may be embedded in a display.

In an embodiment, a system comprises a display screen, one or more inertial or motion sensors, and processing circuitry. The one or more inertial sensors, in operation, generate inertial sensor signals. The processing circuitry is coupled to the one or more inertial sensors. The processing circuitry, in operation, classifies a user-activity type based on the inertial sensor signals, the user-activity type being selected from a plurality of user-activity types including one or more moving activity types, detects a tilt angle of the display screen based on the inertial sensor signals, and classifies a use-condition of the system as used or not used based on the detected tilt angle. The processing circuitry generates a use-warning signal based on whether the classification of the user-activity type is a moving activity type and on whether the classification of the use-condition is used.

In an embodiment, a method, comprises generating, using one or more inertial sensors of an electronic device, inertial sensor signals. A user-activity type of the electronic device is classified based on the inertial sensor signals, the user-activity type being selected from a plurality of user-activity types including one or more moving activity types. A tilt angle of the electronic device is detected based on the inertial sensor signals. A use-condition of the electronic device as used or not used is classified based on the detected tilt angle. A use-warning signal is generated based on whether the classification of the user-activity type is a moving activity type and on whether the classification of the use-condition is used. The generation of the use-warning signal may also be conditioned on a display of the electronic device being on.

In an embodiment, a non-transitory computer-readable medium's contents configure processing circuitry of an electronic device to perform a method. The method comprises classifying a user-activity type of the electronic device based on inertial sensor signals generated by one or more inertial sensors of the electronic device, the user-activity type being selected from a plurality of user-activity types including one or more moving activity types, detecting a tilt angle of the electronic device based on the inertial sensor signals, and classifying a use-condition of the electronic device as used or not used based on the detected tilt angle. A use-warning signal is generated based on whether the classification of the user-activity type is a moving activity type and on whether the classification of the use-condition is used. The contents may comprise instructions executed by the processing circuitry.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, accelerometers, gyroscopes, physical component layout, processing circuitry, etc., have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
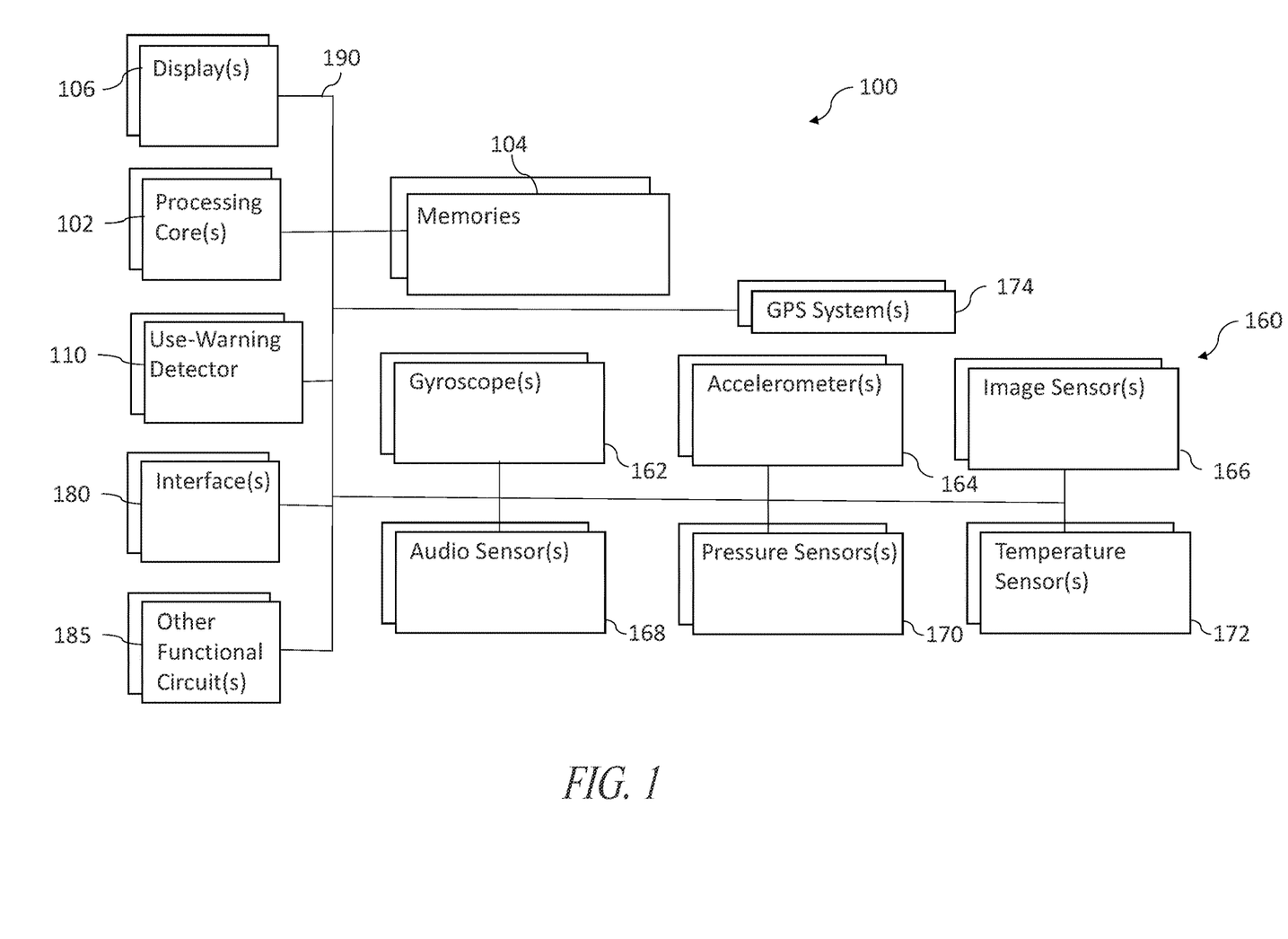
FIG. 1 is a functional block diagram of an embodiment of an electronic device or system according to an embodiment.

FIG. 1 is a functional block diagram of an embodiment of an electronic device or system 100. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which may use position, orientation, gesture, motion, gravity vectors, tilt angles, location and other information, and various combinations thereof, to perform various functions), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100. The system 100 also includes one or more displays 106, which may display information to a user, receive user-input, etc.

The system 100 may include one or more sensors or a sensor array 160, as illustrated, one or more gyroscopes 162, one or more accelerometers 164, one or more image sensors 166, one or more audio sensors 168, one or more pressure sensors 170, one or more temperature sensors 172, etc., one or more global position systems 174, one or more interfaces 180 (e.g., wireless communication interfaces, wired communication interfaces, user-input devices, etc., and various combinations thereof), and other functional circuits 185, which may include antennas, power supplies, one or more built-in self-test (BIST) circuits, etc., and a main bus system 190. The main bus system 190 may include one or more data, address, power and/or control buses coupled to the various components of the system 100.

The one or more gyroscopes 162, in operation, generate rotational data, and may typically provide an output in the form of motion sensor signals indicating a rotational velocity measurements vector indicating a rotational velocity with respect to, for example, three axes of movement. The one or more gyroscopes 162 may typically comprise a micro-electro-mechanical system (MEMS) device that measures the rate of rotation of an object around one or more axis.

The one or more accelerometers 164, in operation, generate acceleration data, and may typically provide an output in the form of motion sensor signals indicating an acceleration measurements vector indicating acceleration along, for example, three axes of movement. The one or more accelerometers 164 may typically comprise a MEMS device that measures the acceleration of an object along one or more axes.

The one or more image sensors 166, in operation, generate digital or analog signals based on optical images. The image sensors 166 may typically include a photosensitive element which generates a signal in response to light waves, and may typically provide digital signal in the form of pixel values.

The one or more audio sensors 168, in operation, generate digital or analog signals based on sound waves. The audio sensors 168 may typically comprise a MEMS device which converts sound waves into electrical signals.

The one or more pressure sensors 170, in operation, generate digital or analog signals based on an ambient pressure. The pressure sensors 170 may typically comprise a MEMS device, such as a capacitive sensor, a piezoresistive sensor, etc., which converts an indication of pressure or a pressure change into electrical signals.

The one or more temperature sensors 172, in operation, generate digital or analog signals based on an ambient temperature, temperature differences, etc. The temperature sensors 172 may typically comprise a resistance temperature detector, a semiconductor detector, a junction detector, etc., which converts an indication of a temperature or a temperature change into electrical signals.

The system 100 as illustrated also includes one or more global positioning systems (GPS) 174. The GPS system 174 may, in operation, generate position and movement information based on GPS signals received from other systems, such as one or more satellite systems.

Using a device, such as the system 100, while moving may represent an unsafe condition. To address these unsafe conditions, use-warning signals may be generated based on determinations of whether a device is in use while the device is moving. The use-warning signals may be used to control the device (e.g., by responding to the use-warning signal by generating signals to cause a warning message to be displayed or signaled to a user, by inhibiting use of the device, etc., and various combinations thereof). Conventionally, use-warning signals are generated based on signals received from a GPS system, such as the GPS system 174, which indicate position or movement information. GPS signals, however, are not always available. For example, reception of the GPS signals may not be available indoors or in certain outdoor conditions. In addition, using a GPS system may add significant costs to a device in terms of hardware, power and control requirements, as well as other operational costs such as subscription fees.

To facilitate the detection of use of the system while moving, the system 100 includes a use-warning detector or use-warning detection and generation circuitry 110 which, in operation, generates a warning signal associated with the device being used while moving based on inertial sensor or motion sensor data, such as motion sensor data generated by a gyroscope 162, an accelerometer 164, or a gyroscope 162 and an accelerometer 164 of the one or more sensors 160 of the system 100. The use-warning detection and generation circuitry 110 may be employed in addition to conventional use of a GPS system, or instead of convention use of a GPS system, to detect use of a device while moving. Thus, the use-warning detector 110 facilities generating a use-warning signal when GPS signals are unavailable.

As discussed in more detail below with reference to FIGS. 2-5, processing circuitry of the system (e.g., the processing core 102, processing circuitry 202 of a sensor array 260 (see FIG. 2), etc.) in operation, classifies a user-activity type based on the motion sensor signals, such as signals from a gyroscope 162, an accelerometer 164, or both. The user-activity type is selected from a plurality of user-activity types including one or more moving activity types. The processing circuitry 102, 202, detects a tilt angle of the device or system based on the motion sensor signals. A use-condition of the device is classified as used or not used based on the detected tilt angle. The processing circuitry 102, 202 generates a use-warning signal based on whether the classification of the user-activity type is a moving activity type and based on whether the classification of the use-condition is used. Optionally, the use-warning signal may also be based on other system information, such as whether a display is on.

Figure 2:
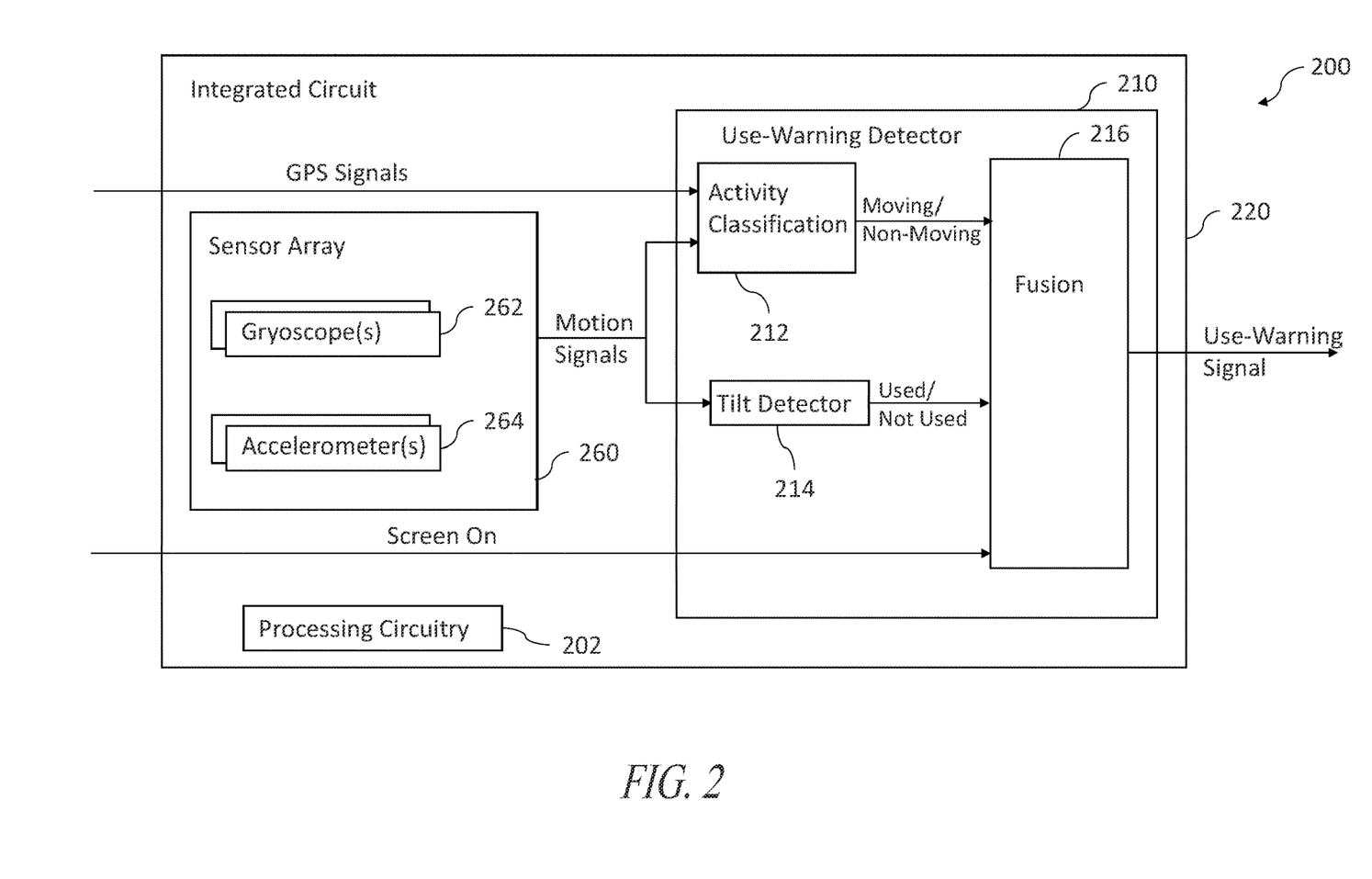
FIG. 2 is functional block diagram of an embodiment of an integrated circuit that may be employed, for example, in the electronic device or system of FIG. 1 according to an embodiment.

FIG. 2 is functional block diagram of an embodiment of a device 200 that may be employed, for example, in the system 100 of FIG. 1, to provide all or part of the functionality of the use-warning detector 110 and the sensor array 160 of the system 100. The device 200 includes an integrated circuit 220. A sensor array 260 is embedded in the integrated circuit 220, and includes one or more inertial sensors, as illustrated one or more gyroscopes 262 and one or more accelerometers 264. The device 200 also includes a use-warning detector 210 embedded in the integrated circuit 220. The use-warning detector 210 includes an activity detection block or circuit 212, a tilt detector block or circuit 214, and a fusion block or circuit 216. The integrated circuit 210 also includes embedded processing circuitry 202, which may employed to implement the functionality of the blocks of the use-warning detector 210. For example, the processing circuitry may comprise signal preprocessing circuitry to compute features, applies filters, etc., and output stabilization circuitry (e.g., meta classifiers).

The activity recognition block 212, in operation, determines whether the device 200 is moving or non-moving using motion sensor data. This may be done, for example by classifying a user activity (e.g., walking, fast walking, running, driving, riding, biking, still, stationary) based on the motion sensor data, and determining whether the classified activity is a considered or classified as a moving or non-moving activity for purposes of generating a use-warning signal. For example, in some embodiments walking, fast walking, running, driving, riding, and biking activity classifications may be considered moving activities, and still and stationary classifications may be considered as non-moving activities. The activity recognition block 212 may be implemented, for example, using a decision tree.

Optionally, the classification of the user-activity type as a moving or non-moving activity type may also be based on GPS signals. This is illustrated in FIG. 2 as an optional providing of GPS signals to the activity classification block 212 of the use-warning detector 210.

Figure 3:
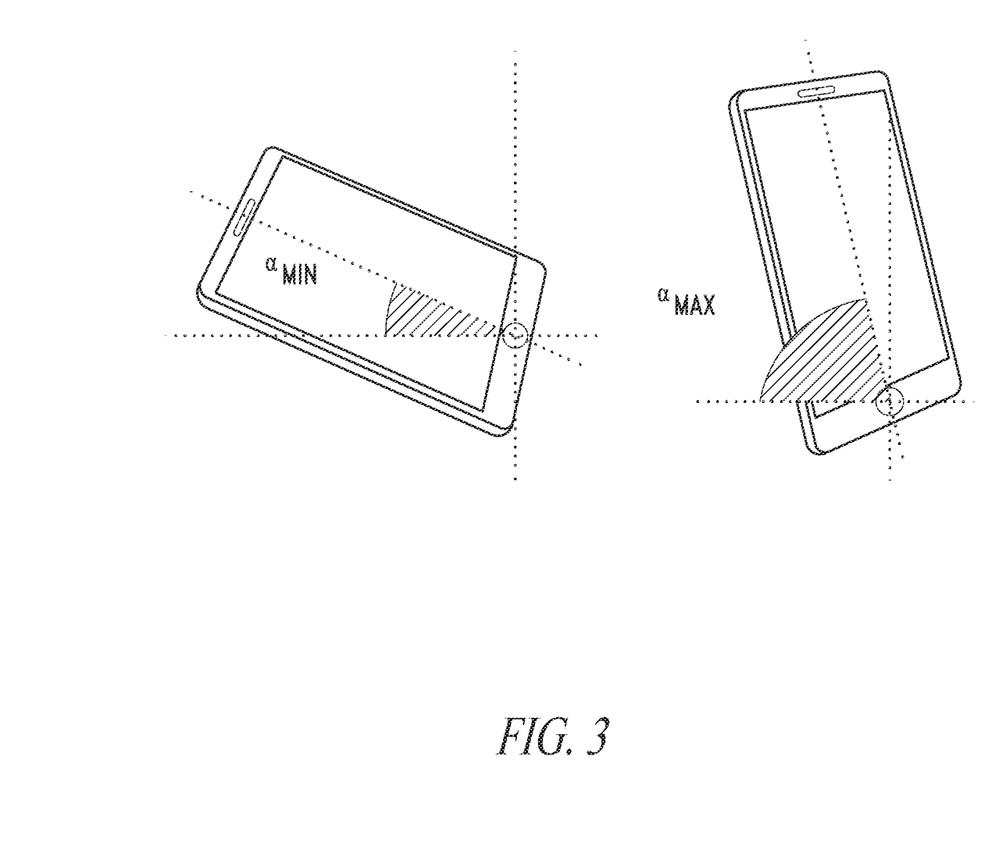
FIG. 3 is a conceptual diagram illustrating detecting a tilt angle and using the detected tilt angle to classify a use condition of a device.

The tilt detection block 214, in operation, detects a tilt angle of the device based on the motion sensor signals, and classifies a use-condition of the device as used or not used based on the detected tilt angle. FIG. 3 is a conceptual diagram illustrating detecting a tilt angle and using the detected tilt angle to classify a use condition of a device, such as the system 100 of FIG. 1 or the device 200 of FIG. 2. In the illustrated example, the device is a tablet, having one or more inertial sensors embedded therein (see, e.g., sensors 262, 264 of FIG. 2). The tilt angle may be detected based on inertial sensor data or motion signals generated by embedded sensors. For example, the tilt angle may be detected based on an accelerometer z-axis signal, which may be averaged or low-pass filtered.

The detected tilt angle may be compared to one or more threshold tilt angles to determine a use condition of the device. For example, a detected tilt angle may be compared to a minimum tilt angle $\alpha_{MIN}$ and a maximum tilt angle $\alpha_{MAX}$. If the detected tilt angle is between the minimum tilt angle $\alpha_{MIN}$ and the maximum tilt angle $\alpha_{MAX}$, the use-condition may be classified as used. If the detected tilt angle is outside a range defined by the minimum tilt angle $\alpha_{MIN}$ and the maximum tilt angle $\alpha_{MAX}$, the use-condition may be classified as not-used. For example, the minimum tilt angle $\alpha_{MIN}$ may be approximately 20 degrees and the maximum tilt angle $\alpha_{MAX}$ may be approximately 65 degrees in an embodiment. The tilt detection block 214 may be implemented, for example, using a finite state machine.

The fusion block 216, in operation, generates a use-warning signal based on whether the classification of the user-activity type is a moving activity type and on whether the classification of the use-condition is used. The fusion block 216 may be implemented, for example, using a finite state machine.

Figure 4:
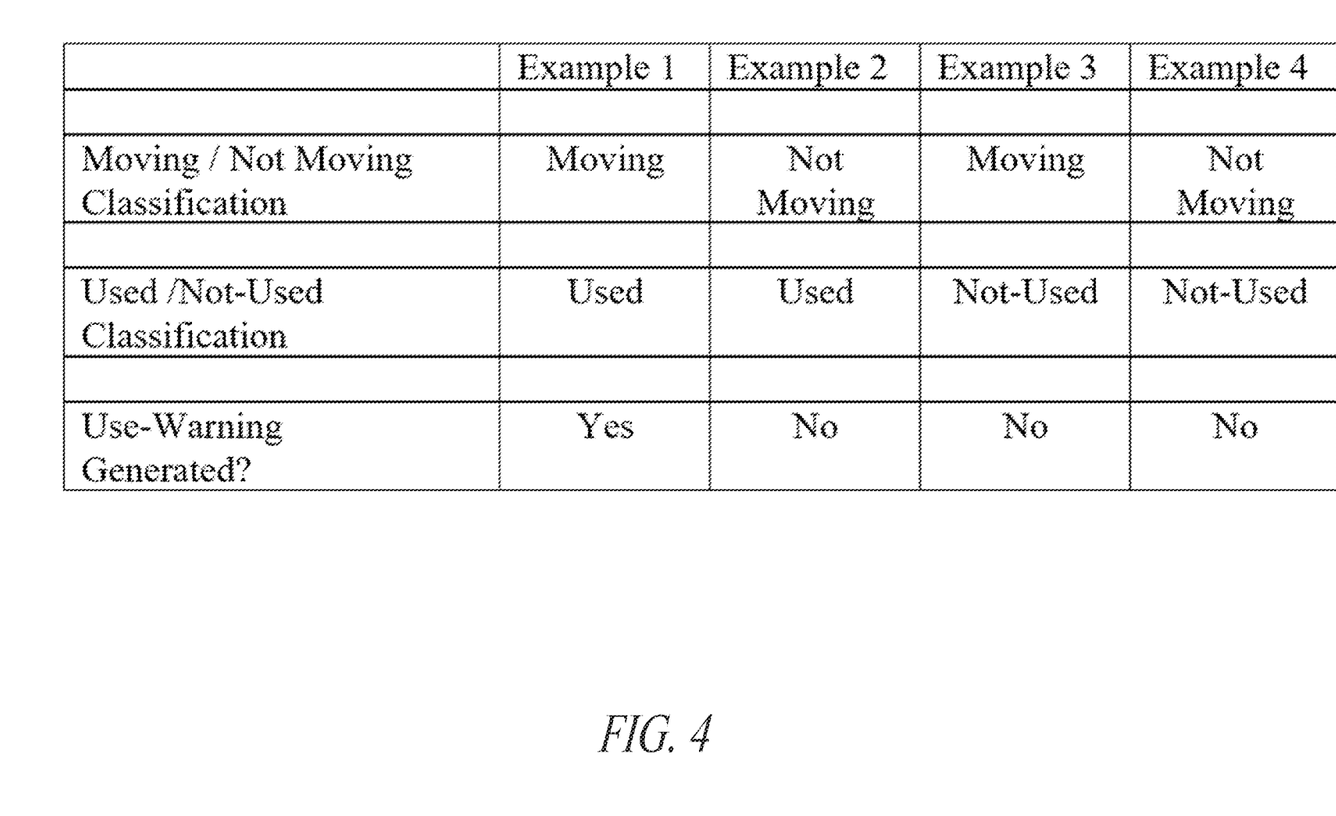
FIG. 4 is a conceptual diagram illustrating how a moving/non-moving activity classification and a used/not-used use condition classification may be fused to generate a use-warning signal according to an embodiment.

FIG. 4 is a conceptual diagram illustrating how the moving/non-moving activity classification and the used/not-used use condition classification may be fused by the fusion block 216 to generate a use-warning signal.

In Example 1 of FIG. 4, the activity classification based on the motion data is a moving activity classification, and the used/not-used condition classification based on the tilt angle (which is detected based on the motion data) is used. In Example 1, the use-warning signal is generated.

In Example 2 of FIG. 4, the activity classification based on the motion data is a not moving activity classification, and the used/not-used condition classification based on the tilt angle is used. In Example 2, the use-warning signal is not generated.

In Example 3 of FIG. 4, the activity classification based on the motion data is a moving activity classification, and the used/not-used condition classification based on the tilt angle is not-used. In Example 3, the use-warning signal is not generated.

In Example 4 of FIG. 4, the activity classification based on the motion data is a not moving activity classification, and the used/not-used condition classification based on the tilt angle is not-used. In Example 4, the use-warning signal is not generated.

Optionally, the use-warning signal may also be based on other system information in some embodiments, such as whether a display is on. This may reduce the generation of false positive use-warning signals. This is illustrated in FIG. 2 as an optional providing of signal indicating whether a screen is on to the fusion block 216 of the use-warning detector 210. For example, if a display is not turned on, generation of the use-warning signal may be inhibited.

Embodiments of the system 100 of FIG. 1 and of the device 200 of FIG. 2 may include more components than illustrated, may include fewer components than illustrated, may combine components, may separate components into sub-components, and various combination thereof. For example, the GPS system 174 may be omitted from some embodiments of the system 100 of FIG. 1. In some embodiments, a sensor array 160, 260 may comprise a combined gyroscope and accelerometer, an inertial measurement unit or device (IMU) package may include an accelerometer, a gyroscope and embedded processing circuitry, which, in operation, implements a use-warning detector, etc., and various combinations thereof.

Figure 5:
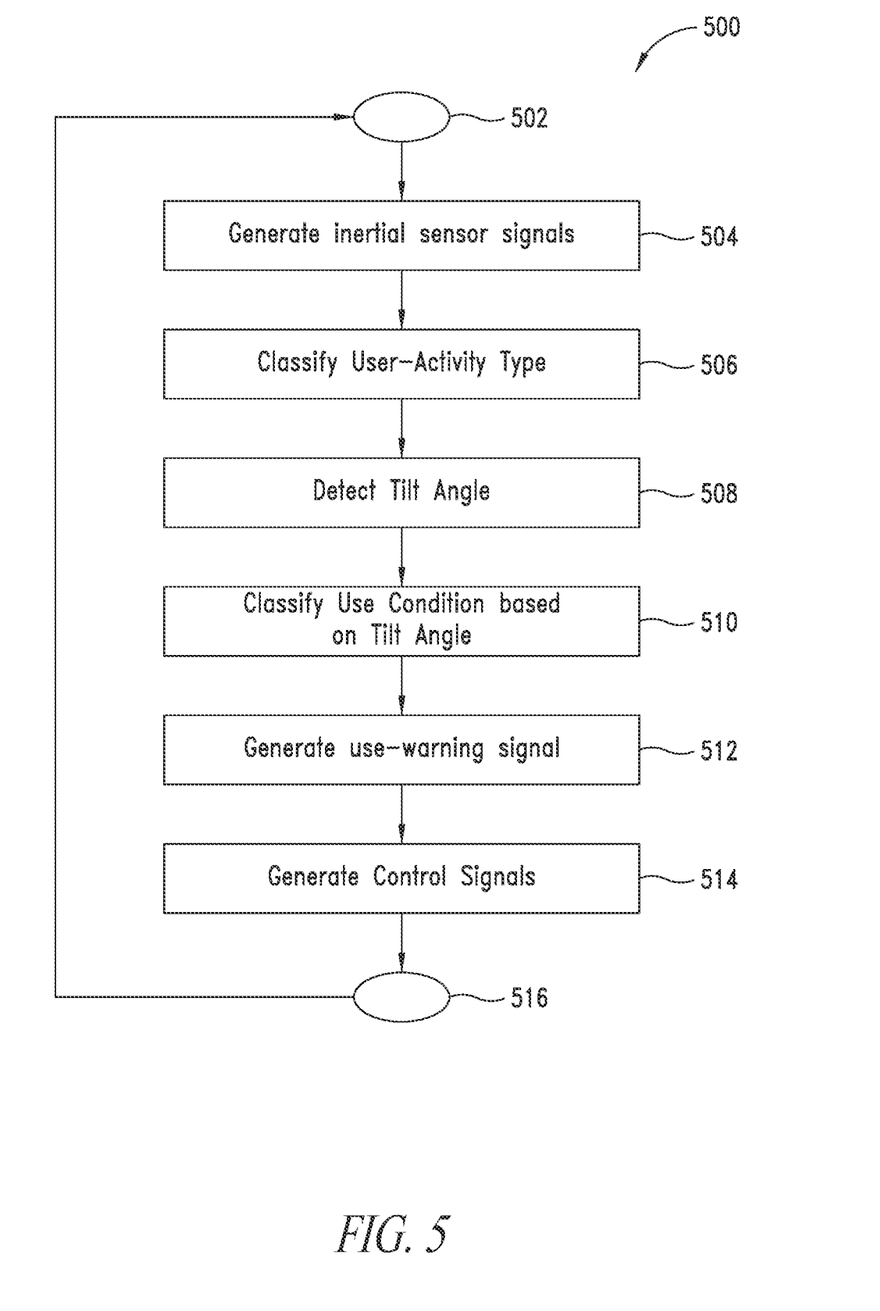
FIG. 5 illustrates an embodiment of a method of generating a use-warning signal, that may be employed by various devices and systems, according to an embodiment.

FIG. 5 illustrates an embodiment of a method 500 of generating a use-warning signal, that may be employed by various devices and systems, such as, for example, the system 100 of FIG. 1, the device 200 of FIG. 2, etc. For convenience, FIG. 5 will be described with reference to the system 100 of FIG. 1 and the device 200 of FIG. 2.

The method 500 starts at 502, and proceeds from 502 to 504. Although the method 500 is illustrated as a sequential process, the process 500 may typically be executed in a loop processing, for example, sample by sample the sensor data, classification by classification the classification results, etc., generating a continuous or periodic indication of whether a use-warning signal is active. In addition, various actions indicated as occurring in sequence in the loop may be performed in parallel or in various sequences.

At 504, the method 500 generates inertial sensor signals indicative of movement or motion of the system 100 or of the device 200. This may be done, for example, using the gyroscope 162 and accelerometer 164 of FIG. 1, using the sensor array 260 of FIG. 2, etc. The method 500 proceeds from 504 to 506.

At 506, the method 500 classifies a user-activity type based on the motion sensor signals generated at 504. The user-activity type is selected from a plurality of user-activity types including one or more moving activity types. The classification of the user-activity type may be performed, for example, as discussed above with reference to the activity recognition block 212 of FIG. 2, and may include classifying a user-activity type, and determining whether the classified user-activity type is a moving or non-moving activity type. The method 500 proceeds from 506 to 508.

At 508, the method 500 detects a tilt angle of a device, such as the system 100 of FIG. 1 or the device 200 of FIG. 2. This may be done, for example, as discussed above with reference to the tilt detector 214 of FIG. 2 and to the conceptual diagram of FIG. 3. The method 500 proceeds from 508 to 510.

At 510, the method 500 classifies a use condition as used or not used based on the detected tilt angle. This may be done, for example, as discussed above with reference to the tilt detector 214 of FIG. 2 and to the conceptual diagram of FIG. 3. The method 500 proceeds from 510 to 512.

At 512, the method 500 generates a use-warning signal based on whether the classification of the user-activity type is a moving activity type and on whether the classification of the use-condition is used. This may be done, for example, as discussed above with reference to the fusion block 216 of FIG. 2 and to the conceptual diagram of FIG. 4. The method 500 proceeds from 512 to 514.

At 514, the method 500 generates one or more control signals to control operation of the device in response to the use-warning signal. For example, when the use-warning signal indicates the device is in use while moving, the device may generate control signals in response to cause a warning message to be conveyed to a user (e.g., to display or sound a warning), may generate control signals to inhibit operation of the device, etc., and various combinations thereof. The method 500 proceeds from 514 to 516.

At 516, the method 500 may perform other processes, may return to 504 to continue the use-warning generation process, etc.

Embodiments of the foregoing processes and methods may contain additional acts not shown in FIG. 5, may not contain all of the acts shown in FIG. 5, may perform acts shown in FIG. 5 in various orders, may combine acts, may split acts into separate acts, and may be otherwise modified in various respects. For example, FIG. 5 may be modified to combine acts 508 and 510, to perform acts 506, 508 and 510 in parallel, to include an explicit determination of whether to return to 504 after 516, etc., and various combinations thereof.

In an embodiment, a device includes one or more motion sensors and processing circuitry coupled to the one or more motion sensors. The one or more sensors, in operation, generate motion sensor signals. The processing circuitry, in operation, classifies a user-activity type based on the motion sensor signals, the user-activity type being selected from a plurality of user-activity types including one or more moving activity types, detects a tilt angle of the device based on the motion sensor signals, and classifies a use-condition of the device as used or not used based on the detected tilt angle. The processing circuitry generates a use-warning signal based on whether the classification of the user-activity type is a moving activity type and on whether the classification of the use-condition is used. The device may include an integrated circuit including the motion sensors and the processing circuitry, and the integrated circuit may be embedded in a display.

In an embodiment, the classifying the use-condition of the device as used or not used based on the detected tilt angle comprises comparing the detected tilt angle to a threshold range of tilt angles. In an embodiment, the processing circuitry, in operation, responds to the comparing indicating the detected tilt angle is within the threshold range by classifying the use-condition as used; responds to the comparing indicating the detected tilt angle is outside the threshold range by classifying the use-condition as not used.

In an embodiment, the device comprises a display. The processing circuitry initiates the generating the use-warning signal based on an indication of whether the display is on. In an embodiment, the processing circuitry, in operation, responds to the use-warning signal indicating the device is being used while moving by generating a signal to cause the display to display a warning message.

In an embodiment, the processing circuitry, in operation, uses a trained classifier to classify the user-activity type based on the motion sensor signals. In an embodiment, the trained classifier is implemented by a decision tree. In another embodiment, the trained classifier is implemented by a convolutional neural network (CNN).

In an embodiment, the device comprises an integrated circuit having the one or more motion sensors and the processing circuitry embedded therein. In an embodiment, the device comprising a display including the integrated circuit.

In an embodiment, the one or more motion sensors include: one or more gyroscopes; one or more accelerometers; or one or more gyroscopes and one or more accelerometers.

In an embodiment, a system comprises a display screen, one or more inertial or motion sensors, and processing circuitry. The one or more inertial sensors, in operation, generate inertial sensor signals. The processing circuitry is coupled to the one or more inertial sensors. The processing circuitry, in operation, classifies a user-activity type based on the inertial sensor signals, the user-activity type being selected from a plurality of user-activity types including one or more moving activity types, detects a tilt angle of the display screen based on the inertial sensor signals, and classifies a use-condition of the system as used or not used based on the detected tilt angle. The processing circuitry generates a use-warning signal based on whether the classification of the user-activity type is a moving activity type and on whether the classification of the use-condition is used.

In an embodiment, the classifying the use-condition of the system as used or not used based on the detected tilt angle comprises comparing the detected tilt angle to a threshold range of tilt angles.

In an embodiment, the processing circuitry initiates the generating the use-warning signal based on an indication of whether the display screen is on. In an embodiment, the processing circuitry, in operation, uses a trained classifier to classify the user-activity type based on the motion sensor signals. In an embodiment, the system comprises an integrated circuit having the one or more inertial sensors and the processing circuitry embedded therein. In an embodiment, the one or more inertial sensors include: one or more gyroscopes; one or more accelerometers; or one or more gyroscopes and one or more accelerometers.

In an embodiment, a method comprises generating, using one or more inertial sensors of an electronic device, inertial sensor signals. A user-activity type of the electronic device is classified based on the inertial sensor signals, the user-activity type being selected from a plurality of user-activity types including one or more moving activity types. A tilt angle of the electronic device is detected based on the inertial sensor signals. A use-condition of the electronic device as used or not used is classified based on the detected tilt angle. A use-warning signal is generated based on whether the classification of the user-activity type is a moving activity type and on whether the classification of the use-condition is used. The generation of the use-warning signal may also be conditioned on a display of the electronic device being on.

In an embodiment, the classifying the use-condition of the electronic device as used or not used based on the detected tilt angle comprises comparing the detected tilt angle to a threshold range of tilt angles.

In an embodiment, a non-transitory computer-readable medium's contents configure processing circuitry of an electronic device to perform a method. The method comprises classifying a user-activity type of the electronic device based on inertial sensor signals generated by one or more inertial sensors of the electronic device, the user-activity type being selected from a plurality of user-activity types including one or more moving activity types, detecting a tilt angle of the electronic device based on the inertial sensor signals, and classifying a use-condition of the electronic device as used or not used based on the detected tilt angle. A use-warning signal is generated based on whether the classification of the user-activity type is a moving activity type and on whether the classification of the use-condition is used. The contents may comprise instructions executed by the processing circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
one or more motion sensors, which, in operation, generate motion sensor signals; and
processing circuitry coupled to the one or more motion sensors, wherein the processing circuitry, in operation:
classifies a user-activity type based on the motion sensor signals, the user-activity type being selected from a plurality of user-activity types including one or more moving activity types;
detects a tilt angle of the device based on the motion sensor signals;
classifies a use-condition of the device as used or not used based on the detected tilt angle, wherein the classifying the use-condition of the device as used or not used based on the detected tilt angle comprises comparing the detected tilt angle to a threshold range of tilt angles; and
generates a use-warning signal based on whether the classification of the user-activity type is a moving activity type and on whether the classification of the use-condition is used.

2. The device of claim 1, wherein the processing circuitry, in operation,
responds to the comparing indicating the detected tilt angle is within the threshold range by classifying the use-condition as used; and
responds to the comparing indicating the detected tilt angle is outside the threshold range by classifying the use-condition as not used.

3. The device of claim 1, comprising a display, wherein the processing circuitry initiates the generating the use-warning signal based on an indication of whether the display is on.

4. The device of claim 1, comprising a display, wherein the processing circuitry, in operation, responds to the use-warning signal indicating the device is being used while moving by generating a signal to cause the display to display a warning message.

5. The device of claim 1, wherein the processing circuitry, in operation, uses a trained classifier to classify the user-activity type based on the motion sensor signals.

6. The device of claim 5, wherein the trained classifier is implemented by a convolutional neural network (CNN).

7. The device of claim 5, wherein the trained classifier is implemented by a decision tree.

8. The device of claim 1, comprising an integrated circuit having the one or more motion sensors and the processing circuitry embedded therein.

9. The device of claim 8, comprising a display including the integrated circuit.

10. The device of claim 1, wherein the one or more motion sensors include:
one or more gyroscopes;
one or more accelerometers; or
one or more gyroscopes and one or more accelerometers.

11. A system, comprising:
a display screen;
one or more inertial sensors, which, in operation, generate inertial sensor signals; and
processing circuitry coupled to the one or more inertial sensors, wherein the processing circuitry, in operation:
classifies a user-activity type based on the inertial sensor signals, the user-activity type being selected from a plurality of user-activity types including one or more moving activity types;
detects a tilt angle of the display screen based on the inertial sensor signals;
classifies a use-condition of the system as used or not used based on the detected tilt angle, wherein the classifying the use-condition of the system as used or not used based on the detected tilt angle comprises comparing the detected tilt angle to a threshold range of tilt angles; and
generates a use-warning signal based on whether the classification of the user-activity type is a moving activity type and on whether the classification of the use-condition is used.

12. The system of claim 11, wherein the processing circuitry initiates the generating the use-warning signal based on an indication of whether the display screen is on.

13. The system of claim 11, wherein the processing circuitry, in operation, uses a trained classifier to classify the user-activity type based on motion sensor signals.

14. The system of claim 11, comprising an integrated circuit having the one or more inertial sensors and the processing circuitry embedded therein.

15. The system of claim 11, wherein the one or more inertial sensors include:
one or more gyroscopes;
one or more accelerometers; or
one or more gyroscopes and one or more accelerometers.

16. A method, comprising:
generating, using one or more inertial sensors of an electronic device, inertial sensor signals;
classifying a user-activity type of the electronic device based on the inertial sensor signals, the user-activity type being selected from a plurality of user-activity types including one or more moving activity types;
detecting a tilt angle of the electronic device based on the inertial sensor signals;
comparing the detected tilt angle to a threshold range of tilt angles;
classifying a use-condition of the electronic device as used or not used based on the comparing of the detected tilt angle to the threshold range of tilt angles; and
generating a use-warning signal based on whether the classification of the user-activity type is a moving activity type and on whether the classification of the use-condition is used.

17. The method of claim 16, comprising initiating the generating of the use-warning signal based on an indication of whether a display screen of the electronic device is on.

18. A non-transitory computer-readable medium having contents which configure processing circuitry of an electronic device to perform a method, the method comprising:
classifying a user-activity type of the electronic device based on inertial sensor signals generated by one or more inertial sensors of the electronic device, the user-activity type being selected from a plurality of user-activity types including one or more moving activity types;
detecting a tilt angle of the electronic device based on the inertial sensor signals;
comparing the detected tilt angle to a threshold range of tilt angles;
classifying a use-condition of the electronic device as used or not used based on the comparing of the detected tilt angle to the threshold range of tilt angles; and
generating a use-warning signal based on whether the classification of the user-activity type is a moving activity type and on whether the classification of the use-condition is used.

19. The non-transitory computer-readable medium according to claim 18, wherein the contents comprise instructions executed by the processing circuitry.

\* \* \* \* \*